United States Patent
Helmstetter et al.

(10) Patent No.: US 6,592,466 B2
(45) Date of Patent: *Jul. 15, 2003

(54) SOUND ENHANCE COMPOSITE GOLF CLUB HEAD

(75) Inventors: Richard C. Helmstetter, Rancho Santa Fe, CA (US); James M. Murphy, Oceanside, CA (US); Herbert Reyes, Laguna Niguel, CA (US); D. Clayton Evans, San Marcos, CA (US); J. Andrew Galloway, Escondido, CA (US); Daniel R. Jacobson, San Diego, CA (US)

(73) Assignee: Callaway Golf Company, Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/064,168

(22) Filed: Jun. 17, 2002

(65) Prior Publication Data

US 2002/0183136 A1 Dec. 5, 2002

Related U.S. Application Data

(63) Continuation-in-part of application No. 09/474,697, filed on Dec. 29, 1999, now Pat. No. 6,406,378, which is a continuation-in-part of application No. 08/958,723, filed on Oct. 23, 1997, now Pat. No. 6,010,411.

(51) Int. Cl.[7] ............................................. A63B 53/04
(52) U.S. Cl. ........................ 473/224; 473/345; 473/348
(58) Field of Search ................................. 473/224, 219, 473/335, 336, 345, 346, 347, 348, 349, 305, 311, 327

(56) References Cited

U.S. PATENT DOCUMENTS

| 4,575,447 | A | * | 3/1986 | Hariguchi | 264/516 |
|---|---|---|---|---|---|
| 5,718,641 | A | * | 2/1998 | Lin | 473/224 |
| 5,908,356 | A | * | 6/1999 | Nagamoto | 473/224 |
| 5,985,197 | A | * | 11/1999 | Nelson et al. | 264/221 |
| 6,102,813 | A | * | 8/2000 | Dill | 473/305 |

* cited by examiner

Primary Examiner—Stephen Blau
(74) Attorney, Agent, or Firm—Michael A. Catania

(57) ABSTRACT

A golf club having a club head composed of a composite material and having an enhanced sound during impact with a golf ball. The golf club head also has a coefficient of restitution greater than 0.8 under test conditions such as the USGA test conditions specified pursuant to Rule 4—1e, Appendix II, of the Rules of Golf for 1998–1999. The golf club head body has a weight strip placed within a ribbon of the body. The sound of the composite golf club head during impact with a golf ball is approximately equivalent to that of a metal wood during impact with a golf ball. The composite golf club head of the present invention has a combined sound level greater than one hundred seventeen decibels during impact with a golf ball.

2 Claims, 9 Drawing Sheets

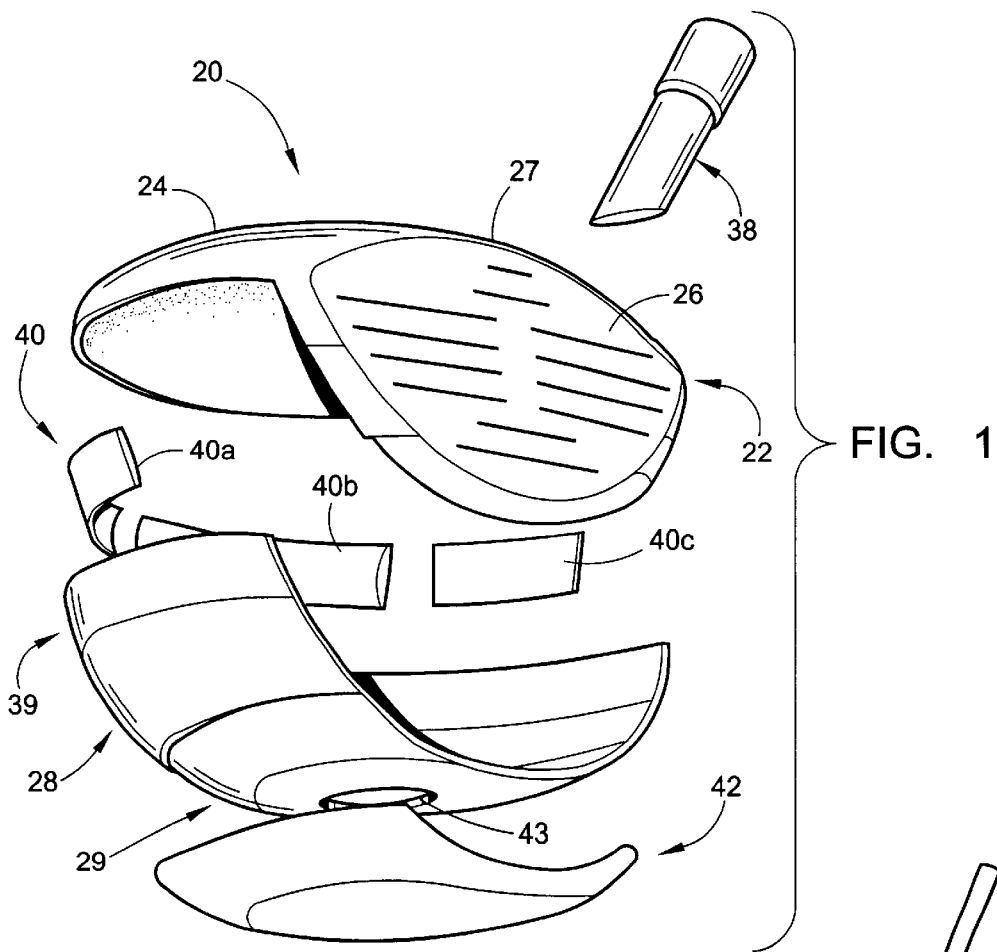
FIG. 1
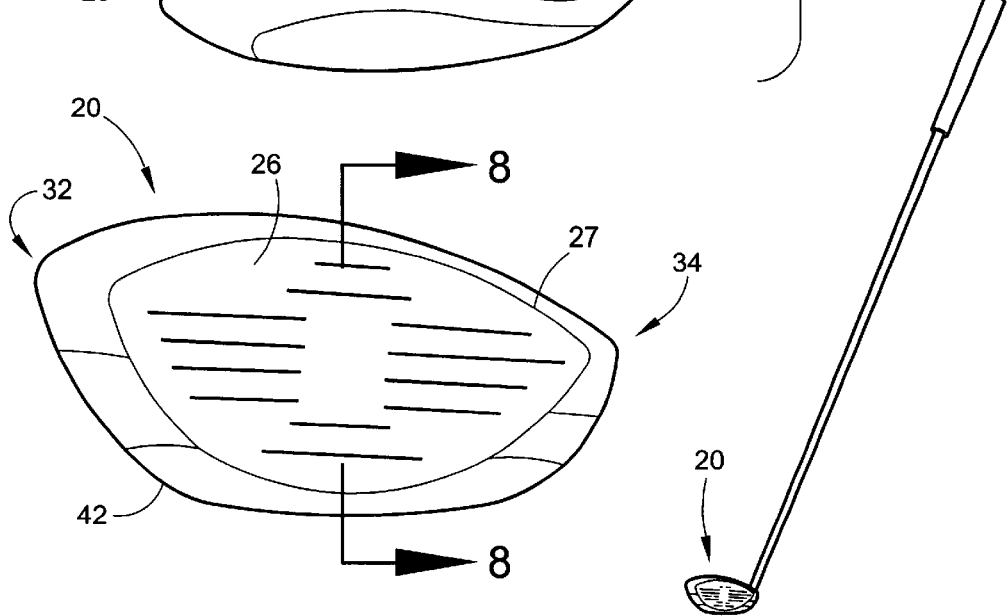
FIG. 2
FIG. 2b

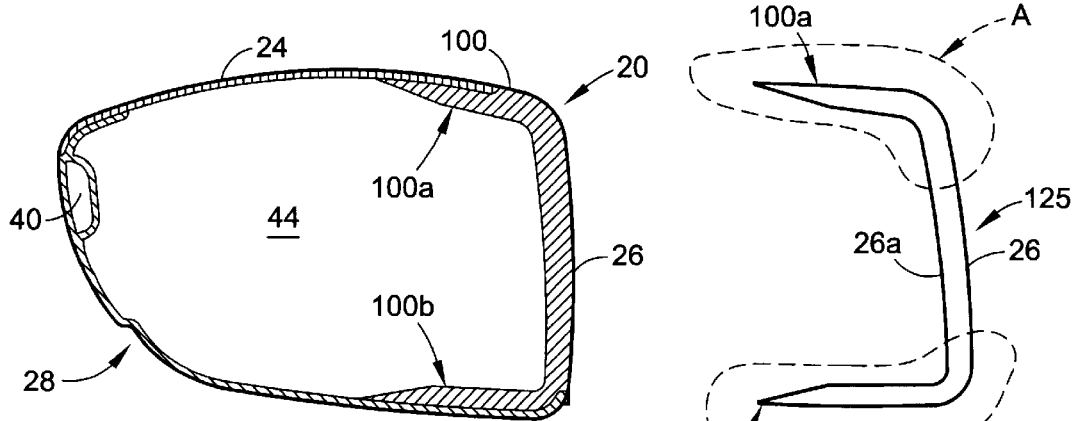
FIG. 8   FIG. 9
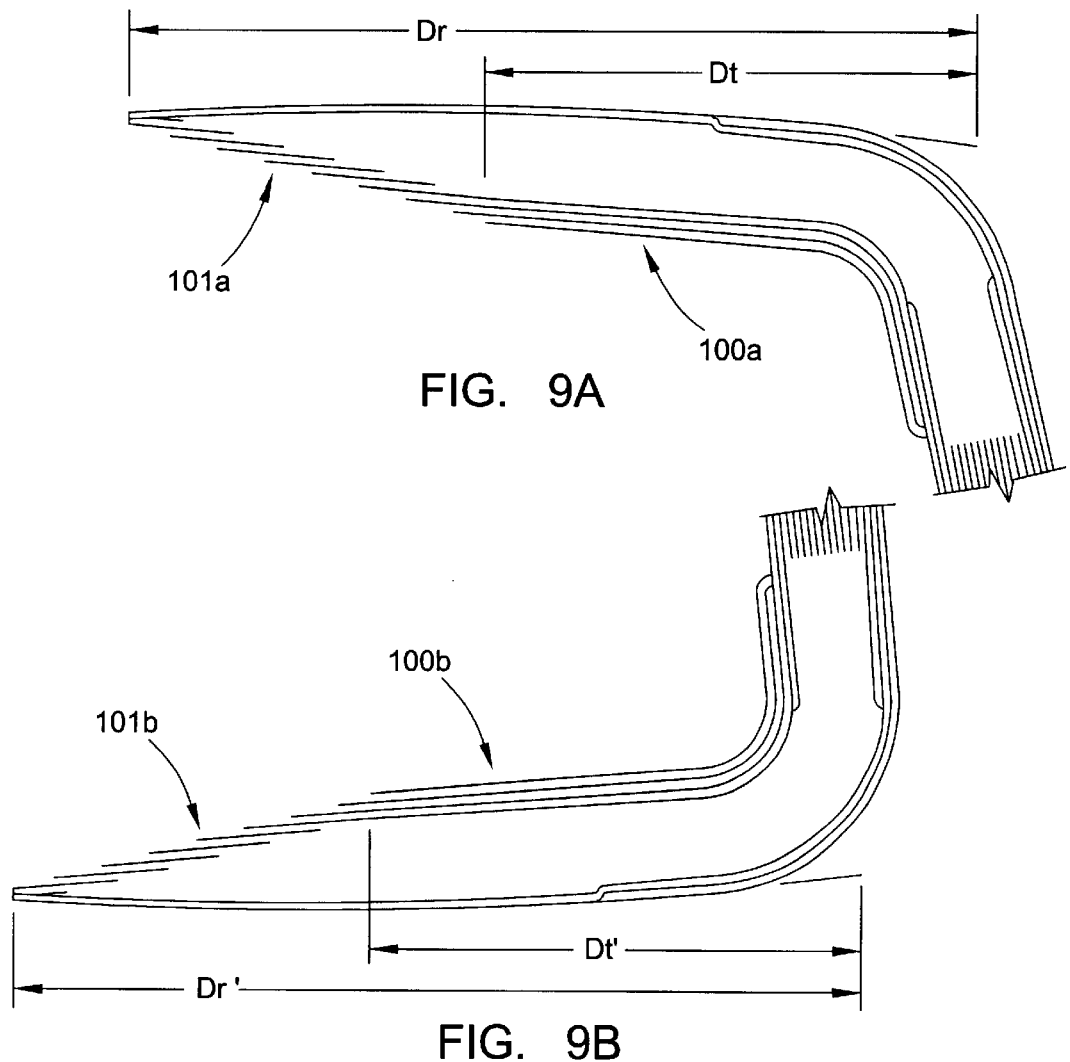
FIG. 9A
FIG. 9B

SOUND ENHANCE COMPOSITE GOLF CLUB HEAD

CROSS REFERENCES TO RELATED APPLICATIONS

This application is a continuation-in-part application of U.S. patent application Ser. No. 09/474,697, filed on Dec. 29, 1999, now U.S. Pat. No. 6,406,378 which is a continuation-in-part of U.S. patent application Ser. No. 08/958,723, filed on Oct. 23, 1997, now U.S. Pat. No. 6,010,411.

FEDERAL RESEARCH STATEMENT

[Not Applicable]

BACKGROUND OF INVENTION

1. Field of the Invention

The present invention relates to a golf club head composed of a composite material. More specifically, the present invention relates to a golf club head composed of composite material and designed to have an enhanced sound when impacting a golf ball.

2. Description of the Related Art

When a golf club head strikes a golf ball, large impacts are produced that load the club head face and the golf ball. Most of the energy is transferred from the head to the golf ball, however, some energy is lost as a result of the collision. The golf ball is typically composed of polymer cover materials (such as ionomers) surrounding a rubber-like core. These softer polymer materials having damping (loss) properties that are strain and strain rate dependent which are on the order of 10–100 times larger than the damping properties of a club striking plate.

Golfers have become accustomed to hearing a particular sound when the club face impacts the golf ball, especially when a driver or fairway wood is used by the golfer. This sound expectation has grown tremendously since the introduction of hollow metal woods. This particular sound imparts a sensation to the golfer of a good shot, a quality club or both.

The sound expectation from a metal wood has become so entrenched that woods lacking this particular sound are believed to be inferior or are undesired by golfers. This sound expectation has greatly effected composite golf clubs since current composite golf clubs have an undesirable "thud" sound, reminiscent of persimmon woods.

Further, the current manufacturers of composite golf clubs have had no desire to improve the sound since improving the performance and lowering the costs of the composite golf clubs have been the major design concerns of such manufacturers. Thus, although the performance and price of composite golf clubs have improved, the sound has remained unchanged and is an obstacle to increased acceptance of composite golf clubs.

SUMMARY OF INVENTION

The present invention provides a composite golf club head that has a predetermined sound during impact with a golf ball. The present invention is able to accomplish this by designing the composite golf club head in a particular shape and orienting the plies of pre-preg composite sheets to enhance the sound during impact with a golf ball.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF DRAWINGS

FIG. 1 is an exploded view of a golf club head of the present invention.

FIG. 2 is a front view of a golf club head of the present invention.

FIG. 2B is a front perspective view of a golf club utilizing a golf club head of the present invention.

FIG. 8 is a cross-sectional view of the golf club head of FIG. 2 along line 8—8.

FIG. 9 is an isolated cross-section view of a face preform of a golf club head of the present invention.

FIG. 9A is an enlarged view of area A of FIG. 9.

FIG. 9B is an enlarged view of area B of FIG. 9.

DETAILED DESCRIPTION

Figure 2A:
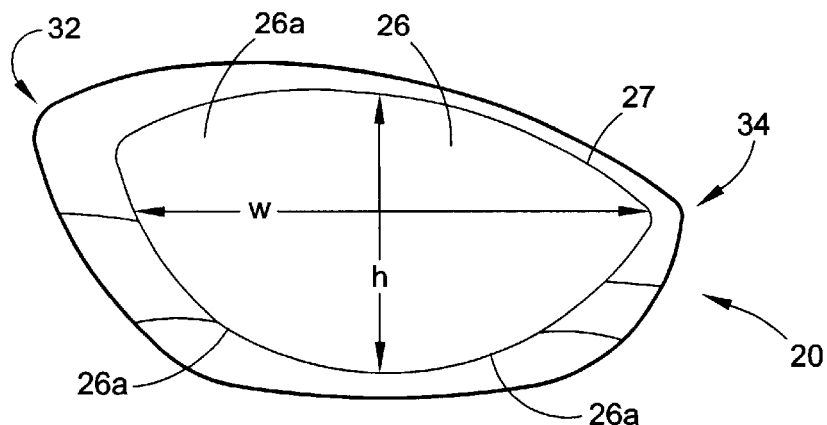
FIG. 2A is a front view of a golf club head of the present invention.
Figure 3:
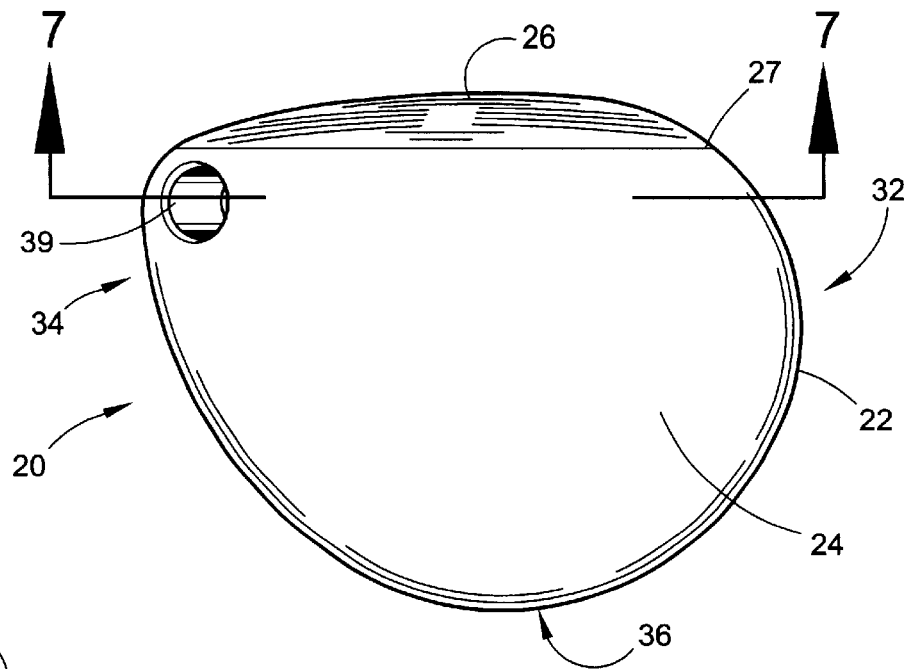
FIG. 3 is a top plan view of a golf club head of the present invention.
Figure 4:
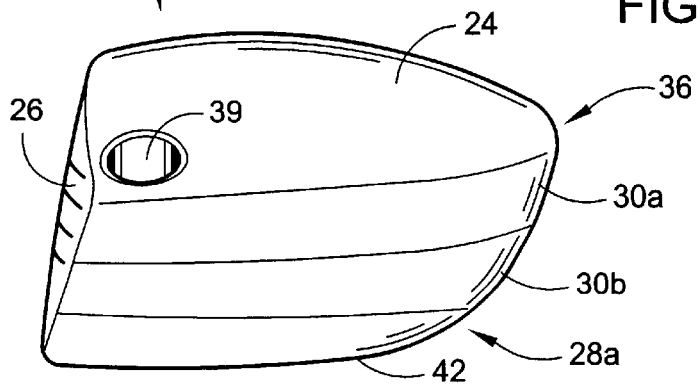
FIG. 4 is a heel end view of a golf club head of the present invention.
Figure 5:
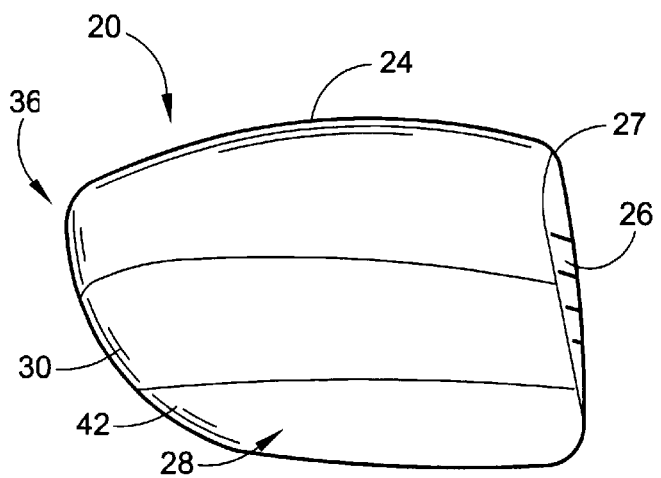
FIG. 5 is a toe end view of a golf club head of the present invention.
Figure 6:
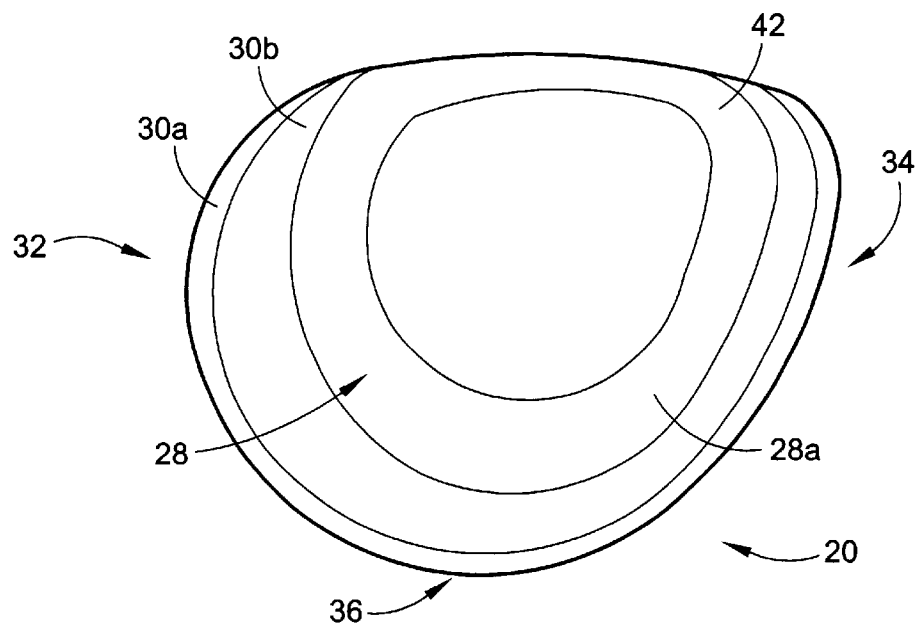
FIG. 6 is a bottom plan view of a golf club head of the present invention.

The present invention is directed at a composite golf club head having an enhanced sound during impact with a golf ball while also having increased performance. More precisely, the composite golf club head of the present invention is louder over long periods of time relative to current composite golf club heads, and it has a high coefficient of restitution.

Sound, or specifically sound waves are longitudinal mechanical waves that compress a medium such as air to stimulate the human ear and brain for the sensation of hearing. The frequency range that can stimulate the human ear for hearing is designated the audible range and ranges from 20 Hertz (cycles) to 20,000 Hertz. The sound waves create a pressure that varies depending on the medium, the frequency and distance. The human ear can tolerate a sound pressure of 28 Pascals, and can detect a sound pressure as low as $2.0 \times 10^{-5}$ Pascals. Sound, or the sound level, is measured in decibels (named after Alexander Graham Bell), and is a parameter related to the intensity of a sound wave according to the following equation:

$\beta = 10 \log_{10}(I/I_o)$ wherein I is the intensity and $I_o$ is a standard reference intensity ($I_o = 10^{-12}$ W/m$^2$). The intensity may be found from the pressure amplitude wherein the average intensity $I = (\frac{1}{2}) P_m^2/v\rho_o$ wherein $P_m$ = the pressure amplitude of the sound in air, v = the velocity of sound in air, and $\rho_o$ = the density of air. When $I = I_o$, the sound level is zero decibels which is the threshold of hearing. For reference, a whisper is twenty decibels, normal conversation is sixty decibels, a pneumatic drill at a distance of three meters has a sound level of ninety decibels, and a jet engine at fifty meters has a sound level of one hundred thirty decibels. A golf club striking a golf ball will emit certain sound levels according to the material and construction of the golf club.

As shown in FIGS. 1–6, a golf club head of the present invention is generally designated 20. The club head 20 is either a fairway wood or a driver. The drivers range in loft angle of from six degrees to fifteen degrees. The club head 20 has a body 22 that is generally composed of a composite material such as plies of carbon pre-preg sheets. The body 22 has a crown 24, a striking plate 26, a sole 28 with a bottom portion 28a and a ribbon 30. The ribbon preferably has an upper ribbon wall 30a and a lower ribbon wall 30b. The ribbon 30 generally extends from a toe end 32 to a heel end 34. The ribbon 30 generally begins at one end of the striking plate 26 and ends at an opposite end of the striking plate 26. A rear 36 of the body 22 is opposite the striking plate 26 and is defined by portions of the ribbon 30, the crown 24 and the sole 28. Also, at the heel end 34 of the club head 20 is an internal tube 38 with an opening 39 for placement of a shaft therein. The internal tube 38 is placed within the hollow interior 44 of the body 22. Within the ribbon is a weight member 40.

A sole plate 42 is disposed within a recess 29 of the bottom portion 28a of the sole 28. The sole plate 42 is preferably composed of a metal material such as aluminum or titanium, and preferably has a mass of 5 grams to 20 grams. A preferred mass for an aluminum sole plate 42 is approximately 11 grams, and a preferred mass for a titanium sole plate 42 is approximately 18 grams. The sole plate 42 is preferably bonded within the recess 29 through use of adhesives. The sole plate 42 preferably has embossed graphics thereon. The sole plate 42 increases the durability of the club head 20 since the sole 28 often impacts the ground during the striking of a golf ball.

The club head 20 of the present invention also has a greater volume than a composite club head of the prior art while maintaining a weight that is substantially lower or equivalent to that of the prior art. The volume of the club head 20 of the present invention ranges from 175 cubic centimeters to 450 cubic centimeters, more preferably ranges from 300 cubic centimeters to 400 cubic centimeters, and is most preferably 360 cubic centimeters for a driver. The mass of the club head 20 of the present invention ranges from 165 grams to 300 grams, preferably ranges from 175 grams to 225 grams, and most preferably from 188 grams to 195 grams. The body 22 of plies of pre-preg material has a mass ranging from 80 grams to 120 grams, and most preferably 98 grams.

The volume of the present invention is increased by increasing the vertical distance of the club head 20 from the sole 28 to the crown 24, as opposed to the horizontal distance of the heel end 34 to the toe end 32. This increase in volume is brought about by the dual wall structure of the ribbon 30. The upper ribbon wall 30a is approximately perpendicular relative to the crown 24, while the lower ribbon wall 30b preferably has angle between 25 degrees to 75 degrees relative to the crown 24.

The greater volume of the club head 20 allows the club head 20 to be more forgiving than prior art golf club heads while providing better performance. The mass of club head 20 is much lower than metal club heads of similar volumes, and thus the large volume does not deter from the swing of a golfer.

The striking plate 26 has a smaller aspect ratio than striking plate plates of the prior art. The aspect ratio as used herein is defined as the width, "w", of the striking plate divided by the height, "h", of the striking plate 26, as shown in FIG. 2A. In one embodiment, the width w is 90 millimeters and the height h is 54 millimeters giving an aspect ratio of 1.666. In conventional golf club heads, the aspect ratio is usually much greater than 1. For example, the original GREAT BIG BERTHA® driver had an aspect ratio of 1.9. The aspect ratio of the present invention preferably ranges from 1.0 to 1.7.

Figure 7:
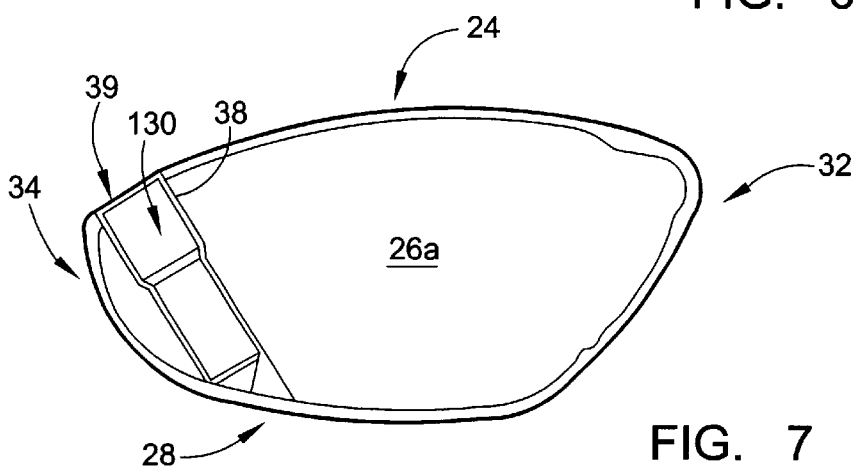
FIG. 7 is a cross-sectional view of the golf club head of FIG. 3 along line 7—7.

As shown in FIG. 7, the internal tube 38 lies within the hollow interior 44 of the club head 20. The internal tube is preferably composed of a metal material and has a mass ranging from 8 grams to 20 grams. The internal tube 38 is most preferably composed of stainless steel and has a mass of approximately 14 grams. The internal tubing 38 has a bore 130 to receive an insert and a shaft, not shown, therein. Such an insert is discussed in U.S. Pat. No. 6,352,482, filed on Aug. 31, 2000, for a Golf Club With Hosel Liner, which is hereby incorporated by reference in its entirety.

Referring specifically to FIG. 1, the club head 20 has a weight member 40 disposed within the plies of pre-preg that compose the ribbon 30 of the club head 20. Preferably, the weight member 40 is composed of three weight members 40a, 40b and 40c. One such weight member 40 is described in U.S. Pat. No. 6,386,990, filed on Dec. 29, 1999, and entitled A Composite Golf Club Head With An Integral Weight Strip, which is hereby incorporated by reference in its entirety. Another such method is described in U.S. Pat. No. 6,527,650 for Internal Weighting For A Composite Golf Club Head, filed on Sep. 5, 2001, and hereby incorporated by reference in its entirety. The weight member 40 has a mass ranging from 30 grams to 80 grams, more preferably 45 grams to 70 grams, and most preferably 54 grams. The weight member 40 is preferably composed of a metal material integrated into a polymer medium. The metal material is preferably selected from copper, tungsten, steel, aluminum, tin, silver, gold, platinum, or the like. A preferred metal is tungsten. The weight member 40 has a density greater than the composite material of the body 22.

Preferably, the weight member 40 extends from approximately the heel end 34 of the striking plate 26 through the rear 36 to the toe end 32 of the striking plate 26. However, the weight member 40 may only extend along the rear 36 of the ribbon 30, the heel end 34 of the ribbon 30, the toe end 32 of the ribbon 30, or any combination thereof. Those skilled in the pertinent axt will recognize that other weighting materials may be utilized without departing from the scope and spirit of the present invention.

The placement of the weighting members 40a–c allows for the moment of inertia of the golf club head 20 to be optimized. A more thorough description of the optimization of the moments of inertia is disclosed in co-pending U.S. patent application Ser. No. 09/796,951, filed on Feb. 27, 2001, entitled High Moment of Inertia Composite Golf Club, and hereby incorporated by reference in its entirety. In one preferred example of the golf club head 20 of the present invention, the moment of inertia about the Ixx axis through the center of gravity is approximately 2566 grams-centimeters squared ("g-cm$^2$"), the moment of inertia about the Iyy axis through the center of gravity is approximately 1895 g-cm$^2$, and the moment of inertia about the Izz axis through the center of gravity is approximately 3368 g-cm$^2$.

As shown in FIGS. 8, 9, 9A and 9B, a return portion 100 is a transition area from a perimeter 27 of the striking plate 26 rearward towards the crown 24. The return portion 100 has a thickness ranging from 0.100 inch to 0.200 inch to control the compliance of the striking plate 26. The return portion 100 has an upper section 100a, a lower section 100b, a heel section 100c, not shown, and a toe section 100d, not shown. The return portion 100 also has a taper region 101, which includes an upper tapering region 101a, a lower tapering region 101b, a heel tapering region 101c, not shown, and a toe tapering region 101d, not shown. The tapering region 101 tapers in thickness from a greater thickness nearer the striking plate portion 26 to a lesser thickness rearward toward the crown 24.

The return portion 100 has a predetermined length which extends rearward from the perimeter 27 of the striking plate portion 26 into the crown 24. Preferably, the distance of the return portion 100, Dr, ranges from 0.25 inch to 2.0 inches, more preferably from 0.5 inch to 1.75 inches, and most preferably 1.5 inches. Preferably, the distance from the perimeter 27 to the beginning of the tapering region 101 of the return portion 100 ranges from 0.25 inch to 1.5 inches, and most preferably 1.0 inch.

Figure 10:
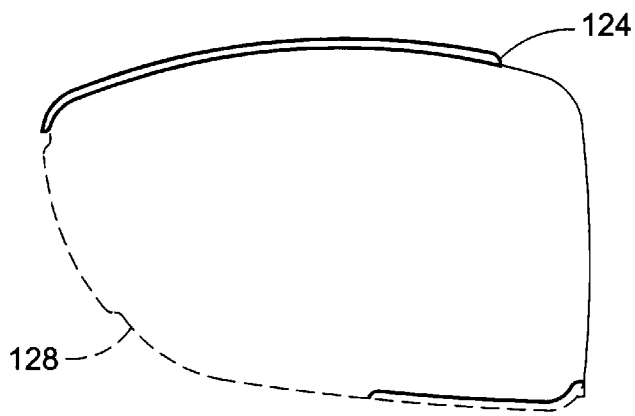
FIG. 10 is an isolated cross-section view of a crown/face preform of a golf club head of the present invention.
Figure 11:
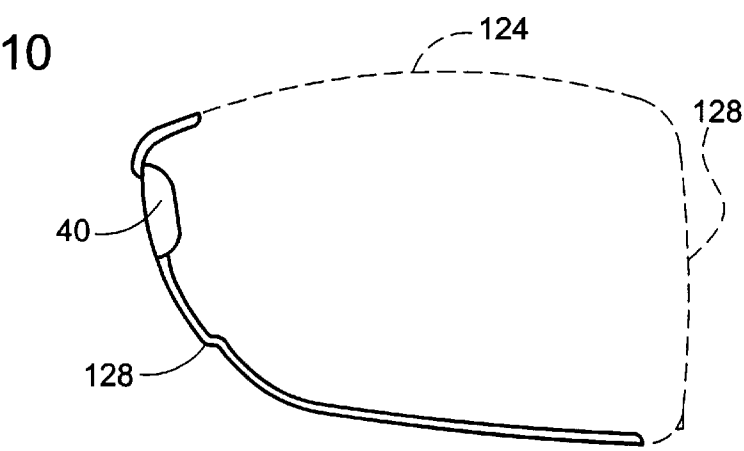
FIG. 11 is an isolated cross-section view of a sole preform of a golf club head of the present invention.
Figure 12:
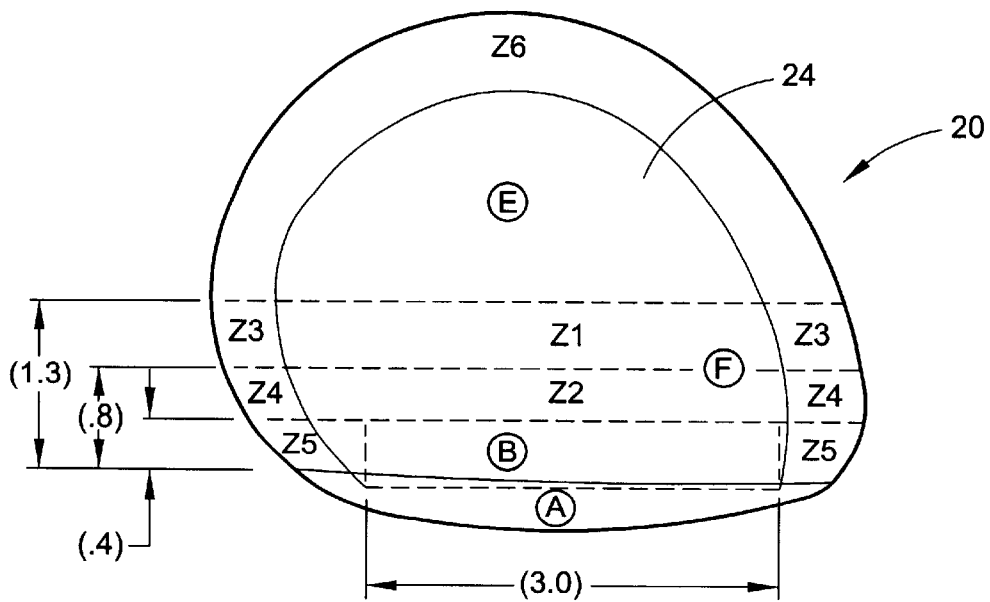
FIG. 12 is a top plan view of a golf club head of the present invention illustrating the variation in thickness of the walls of the golf club head.
Figure 13:
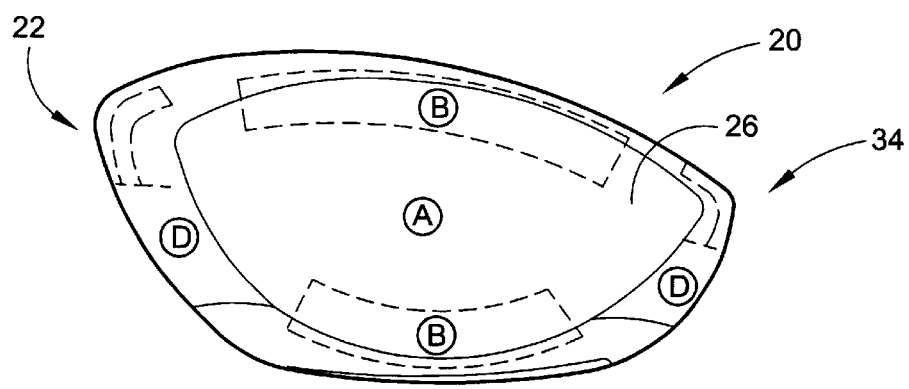
FIG. 13 is a front plan view of a golf club head of the present invention illustrating the variation in thickness of the walls of the golf club head.
Figure 14:
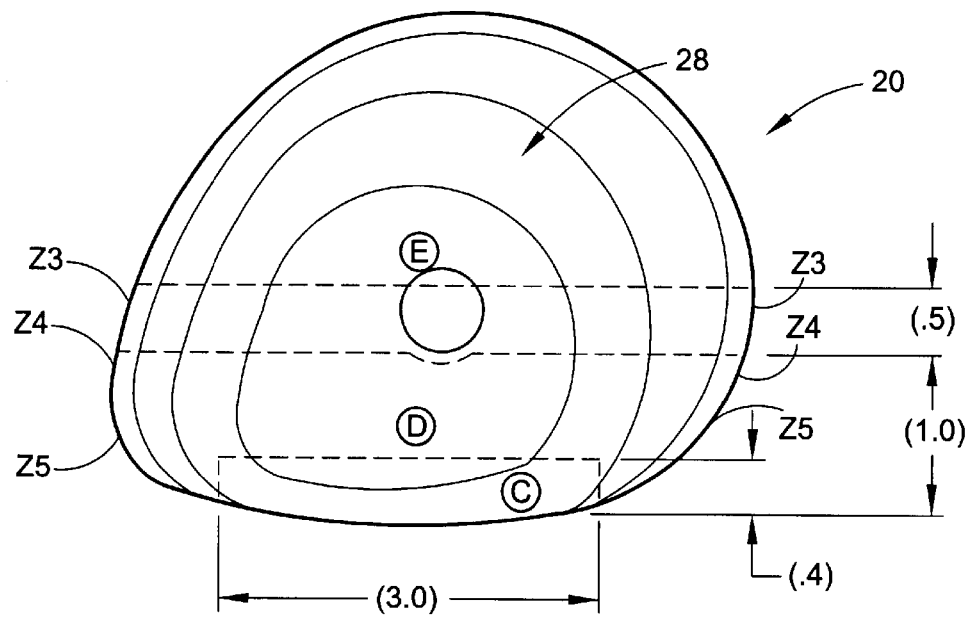
FIG. 14 is a bottom plan view of a golf club head of the present invention illustrating the variation in thickness of the walls of the golf club head.
Figure 15:
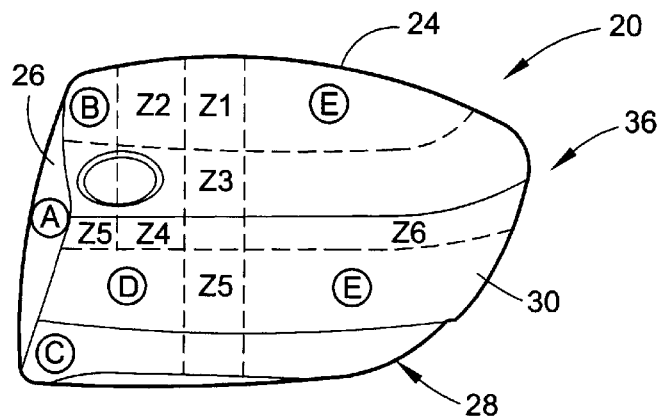
FIG. 15 is a heel end view of a golf club head of the present invention illustrating the variation in thickness of the walls of the golf club head.

The body 22 is manufactured from a face component 125, which includes the striking plate portion 26 and the return portion 100, a crown component 124 and a sole component 128. The crown component 124 overlaps the face component 125, as shown in FIG. 10. The sole component 128 includes the ribbon portion 30 and the bottom portion 28a. The sole component 128 is attached to the crown component 124 and the face component 125.

Figure 16:
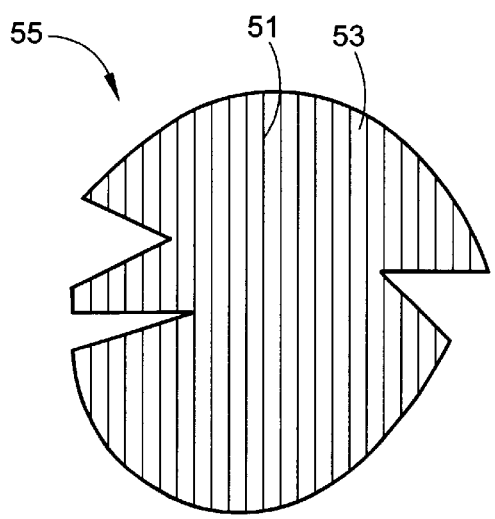
FIG. 16 is a plan view of a face/crown ply having a ninety degree orientation.

FIGS. 16–19 illustrate preferred pre-preg sheets for forming the composite body of the golf club head 20. FIG. 16 illustrates a face/crown ply pre-preg sheet that is generally designated 55. The face/crown ply 55 has a plurality of fibers 51 dispersed within a resin body 53. The fibers 51 are preferably composed of a carbon material. Alternatively, the fibers 51 may be aramid fibers, glass fibers or the like. The resin is typically an epoxy material. The relation of the fibers 51 to the striking plate 26, when the striking plate 26 is in a position to strike a golf ball, determines the orientation of the fibers 51. If the fibers 51 are parallel with the ground, or in other words extending across from the toe end to the heel end, then the face/crown ply 55 has a zero degree orientation. If the fibers 51 are approximately perpendicular to the ground, as shown in FIG. 16, or in other words extending from the crown to the sole, then the face/crown ply 55 has a ninety degrees orientation.

Figure 17:
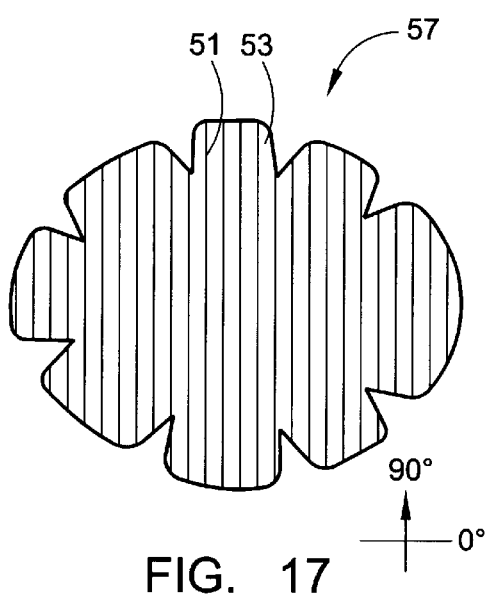
FIG. 17 is a plan view of a full face ply having a ninety degree orientation.

FIG. 17 illustrates a full face ply pre-preg sheet that is generally designated 57. As with the face/crown ply 55, the full face ply 57 has a plurality of fibers 51 dispersed within a resin body 53. The fibers 51 extend from the sole 28 to the crown 24, and thus the full face ply 57 has fibers 51 that are perpendicular to the ground when it is in a position for striking a golf ball. Therefore, the full face ply 57 of FIG. 17 has a ninety degrees orientation.

Figure 18:
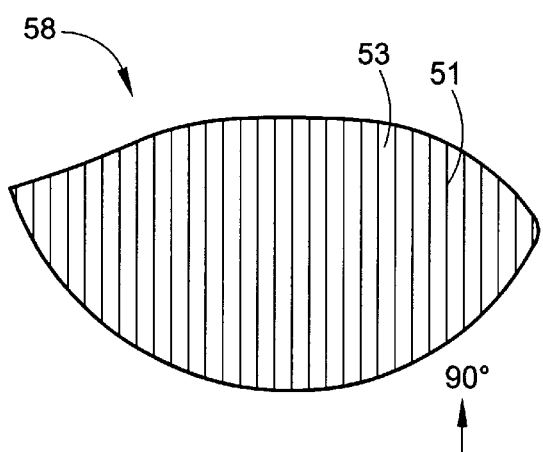
FIG. 18 is a plan view of a face doubler ply having a ninety degree orientation.

FIG. 18 illustrates a face doubler ply pre-preg sheet that is generally designated 58. As with the face/crown ply 55, the face doubler ply 58 has a plurality of fibers 51 dispersed within a resin body 53. The fibers 51 extend from the sole 28 to the crown 24, and thus the face doubler ply 58 has fibers 51 that are perpendicular to the ground when it is in a position for striking a golf ball. Therefore, the face doubler ply 58 of FIG. 18 has a ninety degrees orientation.

Figure 19:
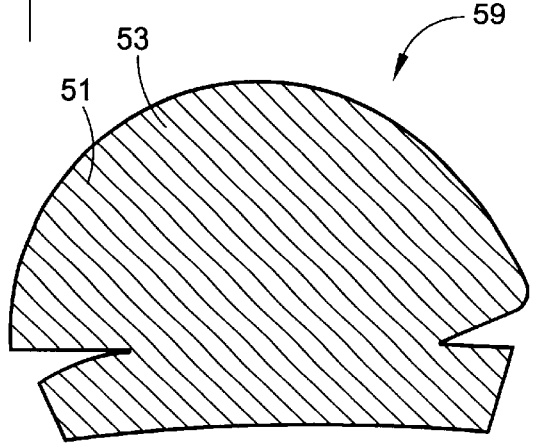
FIG. 19 is a plan view of a sole ply having a negative forty-five degree orientation.

FIG. 19 illustrates a sole ply pre-preg sheet that is generally designated 59. As with the face/crown ply 55, the sole ply 59 has a plurality of fibers 51 dispersed within a resin body 53. The fibers 51 extend at a forty-five degree angle relative to the ground when it is in a position for striking a golf ball. Therefore, the sole ply 59 of FIG. 19 has a forty-five degree orientation.

As previously stated, the preferred composite material is plies of carbon pre-peg sheets. Plies of pre-preg composite sheets are manufacby pulling strands of fiber in a parallel motion, preferably carbon, aramid or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Preferred orientations are zero degrees, plus forty-five degrees, minus forty-five degrees and ninety degrees. Exemplary carbon pre-preg fiber sheets may be obtained from Newport Composites of Santa Ana, Calif., Fiberite Inc. of GreenTexas, or Hexcel Inc. of Pleasonton, Calif.

The manipulation of the thickness of the various regions of the body 22 allows the golf club head 22 to have superior durability, forgiveness and performance as compared to prior art composite golf club heads. As shown in FIGS. 12–15, the thickness of the body 22 is focused on the striking plate portion 26. In a most preferred example: the region designated A of the striking plate portion 26 has a thickness of approximately 0.169 inch; the region designated B, at the junction of the crown 24 and striking plate 26 has a thickness of approximately 0.188 inch; the region designated C of the bottom portion 28a of the sole 28 has a thickness of approximately 0.221 inch; the region designated D of the ribbon 30 and of the bottom portion 28a has a thickness of approximately 0.202 inch; the region designated E of the crown 24, the bottom portion 28a and the ribbon 30 has a thickness of approximately 0.033 inch; and the region designated F of the crown 24 has a thickness of approximately 0.191 inch. The regions designated Z1, Z2, Z3, Z4, Z5 and Z6 are tapering zones where the thickness tapers rearward.

The golf club head 20 is preferably manufactured using a bladder molding process. One such process is described in U.S. Pat. No. 6,248,025, which is hereby incorporated by reference. However, those skilled in the pertinent art will recognize that other manufacturing methods may be utilized without departing from the scope and spirit of the present invention.

The coefficient of restitution of the club head 20 of the present invention under standard USGA test conditions with a given ball ranges from 0.8 to 0.9, preferably ranges from 0.81 to 0.87 and is most preferably 0.82. The coefficient of restitution (also referred to herein as COR) is determined by the following equation: $e=v_2v_1/U_1U_2$ wherein $U_1$ is the club head velocity prior to impact; $U_2$ is the golf ball velocity prior to impact which is zero; $v_1$ is the club head velocity just after separation of the golf ball from the striking plate of the club head; $v_2$ is the golf ball velocity just after separation of the golf ball from the striking plate of the club head; and e is the coefficient of restitution between the golf ball and the club striking plate.

The values of e are limited between zero and 1.0 for systems with no energy addition. The coefficient of restitution, e, for a material such as a soft clay or putty would be near zero, while for a perfectly elastic material, where no energy is lost as a result of deformation, the value of e would be 1.0. The thickness of the striking plate 26 and the orientation of the plies of pre-preg determine the coefficient of restitution of the golf club head 20. Additionally, the thickness of the return 100 of the golf club head 20 allows for a greater deflection in the striking plate 26 which increases the coefficient of restitution of the golf club head 20. The return 100 couples the striking plate 26 to the crown 24 which reduces the loss of energy to the striking plate 26 during impact with a golf ball. If the return 100 is too thick, the striking plate 26 is isolated and rigid, thereby reducing the coefficient of restitution. If the return 100 is too thin, failure of the striking plate 26 may occur upon impact with a golf ball.

Figure 20A:
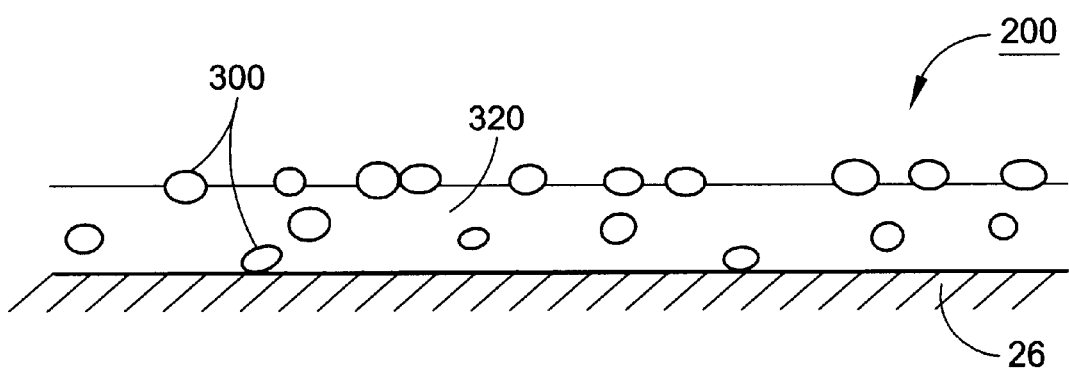
FIG. 20 is a graph of time versus sound level for composite golf club heads.
Figure 20B:
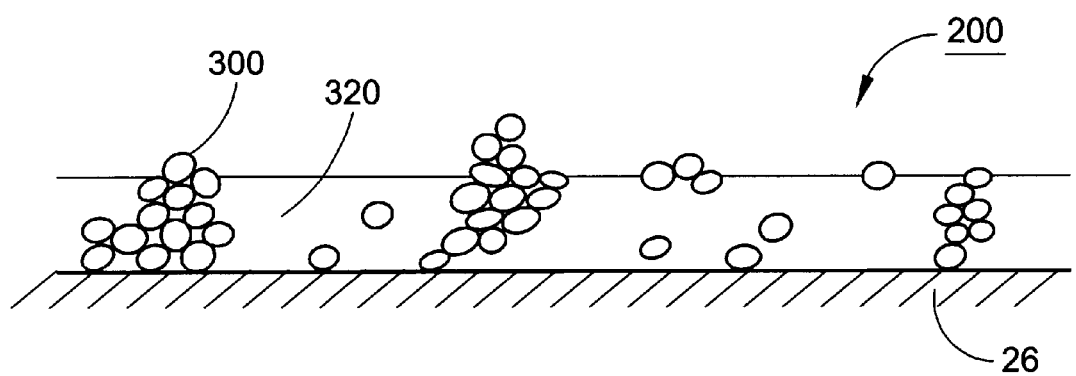
Figure 20C:
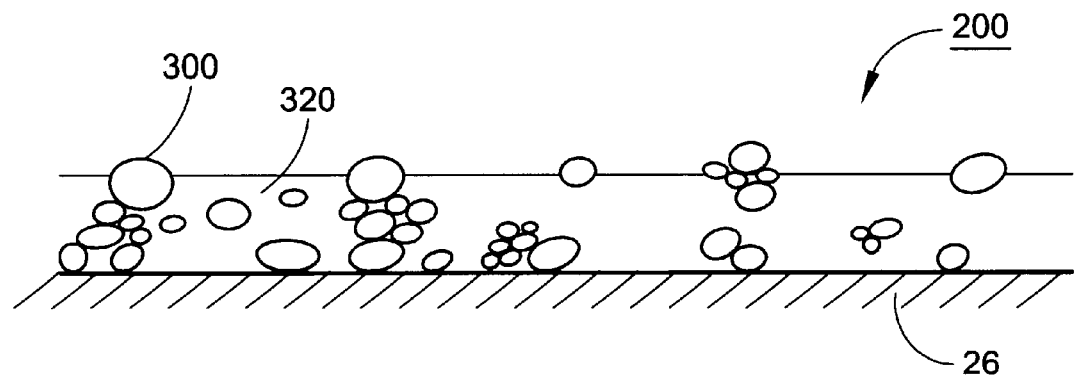
Figure 21:
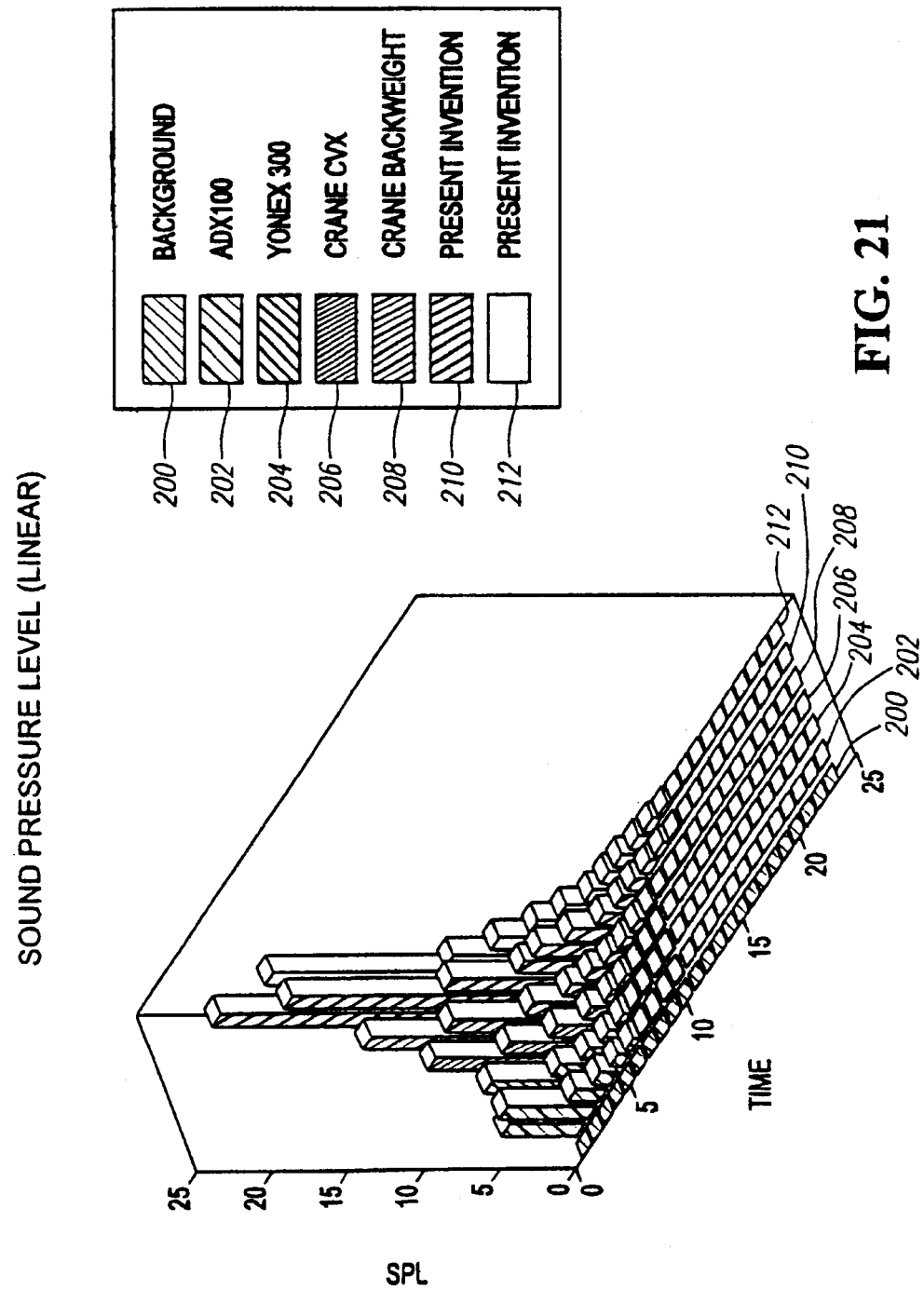
FIG. 21 is a graph of time versus sound level for composite golf club heads with the sound level scaled to illustrate the differences between composite golf club heads.

FIGS. 20 and 21 are graphs of the sound levels of composite golf club heads, including the composite golf club head 20 of the present invention. Table One contains the calculated measurements utilized to chart the graphs. FIG. 21 is a scaled version of FIG. 20 to illustrate the differences between the composite golf club heads. The horizontal axis on each graph of FIGS. 20 and 21 represents time as time steps in increments of 0.0025 seconds. Thus, five time steps are equivalent to 0.0125 second and twenty time steps are equivalent to 0.05 seconds. The vertical axis is a measurement of the sound level of each golf club head during impact with a golf ball. The plotted sound level is the sum of the sound pressure level from the following third octave bands: 5000 Hz; 6300 Hz; 8000 Hz; 10,000 Hz; 12500 Hz; 16,000 Hz; and 20,000 Hz. These octave bands were chosen due to the equivalency in sound to metallic woods. In measuring the sound level, a microphone was placed sixty-four inches away from a teed golf ball. The microphone was also elevated approximately twelve inches from the ground. The golf ball used for the test was a TITLEIST TOUR BALATA golf ball. A golfer swung each of the golf clubs at a velocity of approximately one hundred twenty miles per hour for golf clubs with shafts of forty-five inches in length, and one hundred twenty-eight miles per hour for golf clubs with shafts of fifty inches in length. A measurement was taken at each time step interval (0.0025 seconds), and each measurement was filtered through a conventional sound meter (Larson Davis System 824) at the various frequency bands to generate a measurement of the sound at each of the particular frequency bands. These measurements were combined to obtain the combined sound level measurements in Table One for each time step interval. There was also a Doppler effect due to the movement of the golf club during impact with the golf ball as the golf ball is launched from the golf club striking plate.

Referring to FIGS. 20 and 21, the first row of sound levels 200 represents the background noise, or the ambient noise level. The second row of sound levels 202 is representative of an ADX 100 composite golf club head available from Yonex Golf of Tokyo, Japan. The third row of sound levels 204 is representative of a Aerona 300 composite golf club head available from Yonex Golf of Tokyo Japan. The fourth row of sound levels 206 is representative of a CRANE Convex Sole composite golf club head available from Crane Golf of Tokyo, Japan. The fifth row of sound levels 208 is representative of a CRANE BACKWEIGHT composite golf club head available from Crane Golf of Tokyo, Japan. The sixth and seventh rows of sound levels represent composite golf club heads 20 according to the present invention. The CRANE BACKWEIGHT golf club will be used for comparison since it had the most relevant combined sound levels of the prior art composite golf club heads.

After the first 0.0025 seconds from initial impact, the golf club head 20 of the present invention had a combined sound level of greater than one hundred twenty decibels while the CRANE BACKWEIGHT golf club had a sound pressure level of only one hundred sixteen decibels. More interesting is the sound level comparison at later times after impact with a golf ball. At the second time step, 0.0050 seconds, wherein the golf club head 20 of the present invention had a sound level of at least one hundred nineteen decibels as compared to the CRANE BACKWEIGHT which had a combined sound level of one hundred twelve decibels. At the third time step, 0.0075 seconds, the CRANE BACKWEIGHT only had a combined sound level of one hundred five decibels while the present invention had a sound level of at least one hundred twelve decibels. At 0.04 seconds, the CRANE BACKWEIGHT only had a sound level of sixty decibels while the present invention had a sound level of at least seventy-five decibels and even as high as seventy-eight decibels. Thus, the composite golf club head 20 of the present invention has a higher sound level over a greater period of time than composite golf club heads of the prior art.

TABLE ONE

| Time (sec) | Background | Yonex ADX 100 | Yonex Aerona 300 | Crane Convex | Crane Back Weight 1 | Present Invention | Present Invention |
|---|---|---|---|---|---|---|---|
| 0 | 37 | 107 | 105 | 104 | 100 | 106 | 99 |
| 0.0025 | 38 | 109 | 110 | 113 | 116 | 121 | 119 |
| 0.005 | 37 | 99 | 101 | 108 | 112 | 119 | 120 |
| 0.0075 | 37 | 94 | 95 | 102 | 105 | 112 | 112 |
| 0.01 | 37 | 89 | 88 | 96 | 99 | 107 | 109 |
| 0.0125 | 37 | 83 | 81 | 88 | 95 | 106 | 105 |
| 0.015 | 37 | 76 | 75 | 82 | 91 | 102 | 102 |
| 0.0175 | 38 | 71 | 76 | 77 | 85 | 96 | 96 |

TABLE ONE-continued

| Time (sec) | Background | Yonex ADX 100 | Yonex Aerona 300 | Crane Convex | Crane Back Weight 1 | Present Invention | Present Invention |
|---|---|---|---|---|---|---|---|
| 0.02 | 38 | 70 | 77 | 72 | 84 | 92 | 95 |
| 0.0225 | 38 | 68 | 73 | 70 | 80 | 92 | 93 |
| 0.025 | 37 | 65 | 68 | 68 | 75 | 90 | 90 |
| 0.0275 | 39 | 64 | 67 | 66 | 75 | 87 | 87 |
| 0.03 | 39 | 62 | 64 | 65 | 73 | 84 | 84 |
| 0.0325 | 37 | 60 | 61 | 61 | 71 | 83 | 83 |
| 0.035 | 38 | 61 | 61 | 60 | 66 | 79 | 81 |
| 0.0375 | 38 | 60 | 60 | 59 | 64 | 76 | 78 |
| 0.04 | 37 | 59 | 59 | 59 | 61 | 74 | 76 |
| 0.0425 | 38 | 58 | 58 | 57 | 60 | 73 | 76 |
| 0.045 | 36 | 58 | 57 | 57 | 59 | 70 | 71 |
| 0.0475 | 37 | 57 | 58 | 56 | 59 | 67 | 71 |
| 0.05 | 37 | 56 | 56 | 57 | 59 | 67 | 71 |
| 0.0525 | 37 | 56 | 56 | 56 | 59 | 64 | 70 |
| 0.055 | 36 | 57 | 55 | 56 | 60 | 64 | 67 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A composite golf club head comprising:

a face component composed of a plurality of pre-preg plies having fibers, the plurality of pre-preg plies ranging from 20 to 70 plies, the face component having a striking plate portion and a return portion, the striking plate portion having a thickness in the range of 0.010 inch to 0.250 inch, and the return portion tapering in thickness rearward from a perimeter of the striking plate portion;

a crown composed of a plurality of pre-preg plies ranging from 3 to 20 plies, the crown attached to the face component;

a sole composed of a plurality of pre-preg plies ranging from 3 to 20 plies, the sole having a ribbon portion and a bottom portion the bottom portion of the sole attached to the return portion of the face component and the ribbon portion of the sole attached to the crown;

a weighting member disposed within the plies of pre-preg of the ribbon portion of the sole; and a sole plate attached to the external surface of the bottom portion of the sole, the sole plate composed of a metal material;

wherein the golf club head has a combined sound level greater than one hundred seventeen decibels during impact with a golf ball at approximately 120 miles per hour to approximately 128 miles per hour, when measured from a distance of sixty-four inches from the impact point.

2. A composite golf chub head comprising:

a body composed of a plurality of plies of pre-preg, the body having a hollow interior defined by a striking plate, a crown, a sole, and a ribbon, all of which are composed of plies of pre-preg material, the body having a volume of 275 cubic centimeters to 450 cubic centimeters, the body weighing under 120 grams;

a weight member disposed within the plies of pre-preg of the ribbon, the weight member weighing from 35 grams to 75 grams;

a sole plate attached to an external surface of the sole of the body, the sole plate composed of a metal material and weighing from 5 grams to 20 grams; and an internal tube disposed within the hollow interior of the body, the internal tube composed of a metal material;

wherein the golf club head has a combined sound level greater than one hundred seventeen decibels after 0.0025 seconds from initial impact with a golf ball at approximately 120 miles per hour to approximately 128 miles per hour, when measured from a distance of sixty-four inches from the impact point.

* * * * *